(12) United States Patent
Joye et al.

(10) Patent No.: US 10,958,192 B2
(45) Date of Patent: Mar. 23, 2021

(54) ENERGY CONVERSION SYSTEM AND METHOD

(71) Applicant: KONINKLIJKE PHILIPS N.V., Eindhoven (NL)

(72) Inventors: Neil Francis Joye, Waalre (NL); Mark Thomas Johnson, Arendonk (BE); Hans Kroes, Olst (NL); Lutz Christian Gerhardt, Eindhoven (NL); Michiel van Lierop, Nederweert (NL)

(73) Assignee: Koninklijke Philips N.V., Eindhoven (NL)

( * ) Notice: Subject to any disclaimer, the term of this patent is extended or adjusted under 35 U.S.C. 154(b) by 464 days.

(21) Appl. No.: 15/763,496

(22) PCT Filed: Oct. 4, 2016

(86) PCT No.: PCT/EP2016/073691
§ 371 (c)(1),
(2) Date: Mar. 27, 2018

(87) PCT Pub. No.: WO2017/060250
PCT Pub. Date: Apr. 13, 2017

(65) Prior Publication Data
US 2018/0287512 A1   Oct. 4, 2018

(30) Foreign Application Priority Data
Oct. 5, 2015  (EP) ..................... 15188344

(51) Int. Cl.
*H02N 1/04* (2006.01)
*F03G 7/06* (2006.01)

(52) U.S. Cl.
CPC ............... *H02N 1/04* (2013.01); *F03G 7/065* (2013.01)

(58) Field of Classification Search
CPC .. H02N 1/04; H02N 1/08; H02N 1/06; H02N 1/004; H02N 1/008; H02N 1/006
(Continued)

(56) References Cited

U.S. PATENT DOCUMENTS

| | | | |
|---|---|---|---|
| 7,781,935 B2* | 8/2010 | Jager ....................... | H02N 1/08 310/309 |
| 8,350,394 B2* | 1/2013 | Cottone ................ | H02K 35/02 290/1 R |

(Continued)

FOREIGN PATENT DOCUMENTS

| | | |
|---|---|---|
| CN | 103779885 A | 5/2014 |
| CN | 103780136 A | 5/2014 |

(Continued)

OTHER PUBLICATIONS

Zhong Lin Wang, "Triboelectric Nanogenerators as New Energy Technology for Self-Powered System and as Active Mechanical and Chemical Sensors", Review, International Conference of Nanoscience and Technology, China 2013, Sep. 2013, pp. A-Y.

(Continued)

*Primary Examiner* — Tran N Nguyen
*Assistant Examiner* — Leda T Pham

(57) ABSTRACT

An energy conversion system comprises a generator which generates electrical power in response to movement, wherein the generator comprises first and second elements which generate energy in an energy generation mode. In some examples, these can be brought into and out of contact with each other by a drive mechanism so that the energy conversion system has an (e.g.) intermittent charging mode in which the first and second 5 elements are brought into contact by the drive mechanism and an energy generation mode in which the first and second elements are out of contact. The relative speed, the spacing between, or the relative orientations or positions of the first and second (Continued)

elements are controlled during the energy generation mode to decrease the variation in output power or voltage of the generator. This system controls the physical positions or the motion of the 10 elements of the generator during the energy generation mode in order to implement a more constant power or voltage generation. This enables any required power conversion circuitry to be simplified.

20 Claims, 7 Drawing Sheets

(58) Field of Classification Search
    USPC .......................................................... 310/308
    See application file for complete search history.

(56) References Cited

U.S. PATENT DOCUMENTS

| 8,760,032 | B2* | 6/2014 | Despesse | H02N 1/08 |
| | | | | 310/309 |
| 2004/0163471 | A1* | 8/2004 | Frey | H02N 1/08 |
| | | | | 73/514.18 |
| 2010/0163376 | A1* | 7/2010 | Yoon | H02N 1/006 |
| | | | | 200/181 |
| 2014/0055002 | A1* | 2/2014 | Nakatsuka | H02N 1/08 |
| | | | | 310/308 |
| 2014/0239775 | A1* | 8/2014 | Denes | H01L 41/0835 |
| | | | | 310/366 |

FOREIGN PATENT DOCUMENTS

| CN | 203933440 U | 11/2014 |
| CN | 104734556 A | 6/2015 |
| EP | 1819035 A2 | 8/2007 |

OTHER PUBLICATIONS

Zhu, et al., "Radial-arrayed rotary electrification for high performance tribolelectric generator", Nature Communications, Received Dec. 7, 2013, Published Mar. 4, 2014, pp. 1-9.

Niu, et al., "Theory of Sliding-Mode Triboelectric Nanogenerators", Advanced Materials 2013, vol. 25, pp. 6184-6193.

* cited by examiner

ENERGY CONVERSION SYSTEM AND METHOD

CROSS-REFERENCE TO PRIOR APPLICATIONS

This application is the U.S. National Phase application under 35 U.S.C. § 371 of International Application No. PCT/EP2016/073691, filed on Oct. 4, 2016, which claims the benefit of European Application Serial No. 15188344.4, filed Oct. 5, 2015. These applications are hereby incorporated by reference herein, for all purposes.

FIELD OF THE INVENTION

The invention relates to an energy conversion system for converting mechanical energy into electrical energy, and methods of energy conversion.

BACKGROUND OF THE INVENTION

One example of such a system, whereby mechanical energy may be converted into electrical energy, is a triboelectric energy generation system. The triboelectric effect (also known as triboelectric charging) is a contact-induced electrification in which a material becomes electrically charged after it is contacted with a different material through friction. Triboelectric generation is based on converting mechanical energy into electrical energy through methods which couple the triboelectric effect with electrostatic induction. It has been proposed to make use of triboelectric generation to power wearable devices such as sensors and smartphones by capturing the otherwise wasted mechanical energy from such sources as walking, random body motions, the wind blowing, vibration or ocean waves (see, for example: Wang, Sihong, Long Lin, and Zhong Lin Wang. "Triboelectric nanogenerators as self-powered active sensors" Nano Energy 11 (2015): 436-462).

The triboelectric effect is based on a series that ranks various materials according to their tendency to gain electrons (become negatively charged) or lose electrons (become positively charged). This series is for example disclosed in A. F. Diaz and R. M. Felix-Navarro, a semi-quantitative tribo-electric series for polymeric materials: the influence of chemical structure and properties, Journal of Electrostatics 62 (2004) 277-290. The best combinations of materials to create static electricity are one from the positive charge list and one from the negative charge list (e.g. PTFE against copper, or FEP against aluminum). Rubbing glass with fur, or a comb through the hair are well-known examples from everyday life of triboelectricity.

In its simplest form, a triboelectric generator thus uses two sheets of dissimilar materials, one an electron donor, the other an electron acceptor. When the materials are in contact, electrons are exchanged from one material to the other. This is simply the triboelectric effect. If the sheets are then separated, each sheet holds an electrical charge (of differing polarity), isolated by the gap between them. If an electrical load is connected between electrodes placed at the outer edges of the two surfaces, any further displacement of the sheets, either laterally or perpendicularly, will induce in response a current flow between the two electrodes. This is simply an example of electrostatic induction. As the distance between the respective charge centers of the two plates is increased, so the attractive electric field between the two, across the gap, weakens, resulting in an increased potential difference between the two outer electrodes, as electrical attraction of charge via the load begins to overcome the electrostatic attractive force across the gap.

In its simplest form, a triboelectric generator thus uses two sheets of dissimilar materials, one an electron donor, the other an electron acceptor. One or more of the materials can be an insulator. Other possible materials might include semiconductor materials, for example silicon comprising a native oxide layer. When the materials are brought into contact, electrons are exchanged from one material to the other. This is simply the triboelectric effect. If the sheets are then separated, each sheet holds an electrical charge (of differing polarity), isolated by the gap between them, and an electric potential is built up. If an electrical load is connected between electrodes placed at the backside of the two material surfaces, any further displacement of the sheets, either laterally or perpendicularly, will induce in response a current flow between the two electrodes. This is simply an example of electrostatic induction. As the distance between the respective charge centers of the two plates is increased, so the attractive electric field between the two, across the gap, weakens, resulting in an increased potential difference between the two outer electrodes, as electrical attraction of charge via the load begins to overcome the electrostatic attractive force across the gap.

In this way, triboelectric generators convert mechanical energy into electrical energy through a coupling between two main physical mechanisms: contact electrification (tribo-charging) and electrostatic induction.

By cyclically increasing and decreasing the mutual separation between the charge centers of the plates, so current can be induced to flow back and forth between the plates in response, thereby generating an alternating current across the load. The power output can be increased by applying micron-scale patterns to the polymer sheets. The patterning effectively increases the contact area and thereby increases the effectiveness of the charge transfer.

Recently, an emerging material technology for power generation (energy harvesting) and power conversion has been developed which makes use of this effect, as disclosed in Wang, Z. L., "Triboelectric nanogenerators as new energy technology for self-powered systems and as active mechanical and chemical sensors." *ACS nano* 7.11 (2013): 9533-9557. Based on this effect several device configurations have been developed of so-called triboelectric nanogenerators ("TENG") or triboelectric generators ("TEG").

Since their first reporting in 2012, the output power density of TEGs has been greatly improved. The volume power density may reach more than 400 kilowatts per cubic meter, and an efficiency of ~60% has been demonstrated (ibid.). In addition to high output performance, TEG technology carries numerous other advantages, such as low production cost, high reliability and robustness, and low environmental impact.

The TEG may be used as an electrical power generator, i.e. energy harvesting from, for example, vibration, wind, water, random body motions or even conversion of mechanically available power into electricity. The generated voltage is a power signal.

TEGs may broadly be divided into four main operational classes.

A first mode of operation is a vertical contact-separation mode, in which two or more plates are cyclically brought into or out of contact by an applied force. This may be used in shoes, for example, where the pressure exerted by a user as they step is utilized to bring the plates into contact. One example of such a device has been described in the article "Integrated Multilayered Triboelectric Nanogenerator for Harvesting Biomechanical Energy from Human Motions" of Peng Bai et. al. in ACS Nano 2013 7(4), pp. 3713-3719. Here, the device comprises a multiple layer structure formed on a zigzag shaped substrate. The device operates based on surface charge transfer due to contact electrification. When a pressure is applied to the structure, the zigzag shape is compressed to create contact between the different layers, and the contact is released when the pressure is released. The energy harvested might be for example used for charging of mobile portable devices.

A second mode of operation is a linear sliding mode, wherein plates are induced to slide laterally with respect to one another in order to change the area of overlap between them. A potential difference is induced across the plates, having an instantaneous magnitude in proportion to the rate of change of the total overlapping area. By repeatedly bringing plates into and out of mutual overlap with one another, an alternating current may be established across a load connected between the plates.

A design which enables energy to be harvested from sliding motions is disclosed in the article "Freestanding Triboelectric-Layer-Based Nanogenerators for Harvesting Energy from a Moving Object of Human Motion in Contact and Non-Contact Modes" in Adv. Mater. 2014, 26, 2818-2824. A freestanding movable layer slides between a pair of static electrodes. The movable layer may be arranged not to make contact with the static electrodes (i.e. at small spacing above the static electrodes) or it may make sliding contact.

A third mode of operation is a single electrode mode in which one surface is for example grounded—for example, a floor road—and a load is connected between this first surface and ground (see for example Yang, Ya, et al. "Single-electrode-based sliding triboelectric nanogenerator for self-powered displacement vector sensor system.", *ACS nano* 7.8 (2013): 7342-7351). The second surface—not electrically connected to the first—is brought into contact with the first surface and tribocharges it. As the second surface is then moved away from the first, the excess charge in the first surface is driven to ground, providing a current across the load. Hence only a single electrode (on a single layer) is used in this mode of operation to provide an output current.

A fourth mode of operation is a freestanding triboelectric layer mode, which is designed for harvesting energy from an arbitrary moving object to which no electrical connections are made. This object may be a passing car, passing train, or a shoe, for example. (Again, see "Triboelectric nanogenerators as new energy technology for self-powered systems and as active mechanical and chemical sensors." *ACS nano* 7.11 (2013): 9533-9557).

There are still further designs of triboelectric generator, such as a double-arch shaped configuration based on contact electrification. A pressure causes the arches to close to make contact between the arch layers, and the arches returns to the open shape when the pressure is released. A triboelectric generator has also been proposed which is formed as a harmonic resonator for capturing energy from ambient vibrations.

One particular subset of linear sliding mode TEGs which have been developed are rotational disk TEGs which can be operated in both a contact (i.e., continuous tribocharging and electrostatic induction) or a non-contact mode (i.e., only electrostatic induction after initial contact electrification). Rotational disk TEGs typically consist of at least one rotor and one stator each formed as a set of spaced circle sectors (segments). The sectors overlap and then separate as the two disks rotate relative to each other. As described above, a current may be induced between two laterally sliding—oppositely charged—layers, with a magnitude in proportion to the rate of change of the area of overlap. As each consecutively spaced sector of the rotor comes into and then out of overlap with a given stator sector, so a current is induced between the two sector plates, initially in a first direction, as the plates increase in overlap, and then in the opposite direction as the plates decrease in overlap.

The limitations of early versions of segmentally structured disk TEGs (Long Lin et al., Segmentally Structured Disk Triboelectric Nanogenerator for Harvesting Rotational Mechanical Energy, Nano Lett., 2013, 13 (6), pp. 2916-2923) were that the rotational and stationary triboelectric layers require deposition of metal electrodes and connection with electrical leads, leading to inconvenient operation of the rotational part.

A disk TEG with both groups of patterned electrodes attached onto a stationary disk, together with a freestanding triboelectric layer on a rotational disk can resolve these issues, as disclosed in Long Lin et al., Noncontact Free-Rotating Disk Triboelectric Nanogenerator as a Sustainable Energy Harvester and Self-Powered Mechanical Sensor. ACS Appl. Mater. Interfaces, 2014, 6 (4), pp. 3031-3038.

With such a structure, there is no necessity for electrode deposition or electrical connection for the rotational part, which dramatically improves the operating facility of the energy harvester.

Rotational disk TEGs, and indeed linear sliding mode TEGs in general, can be operated in both a contact mode and a non-contact mode. Although contact is desired to tribo-charge the plates (both initially and also subsequently, to counteract leakage) the electrostatic induction process itself (by means of which the electrical energy is generated) does not require contact between the plates, but operates well with a small plate separation (of, for example, approximately 0.5 mm).

Operating in a contact mode—wherein the plates are maintained in continual frictive contact—results in a higher power output, since the plates are being continually charged, and hence continually maintained at some theoretical maximal charge capacity (defined by the capacitance of the bi-plate system) by continual replacement of charge lost through leakage etc. The greater the charge which can be maintained on the plates, the greater the electrostatic inductive output which can be generated, since naturally a greater charge density induces a greater electrostatic force between electrons in the plates.

However, operating in contact mode brings with it various difficulties, including excess noise production and deterioration of device materials through surface abrasion.

The applicant has proposed (but not yet published) a system for triboelectric generation wherein the operating mode of the generator may be switched (e.g. intermittently) between a contact mode, during which the plates are tribo-charged, and a non-contact mode, during which energy is generated (or converted) through electrostatic induction. The controller may control the timing and/or duration of the contact and non-contact phases in dependence on a detected surface charge state of the plates (or, alternatively, it may output information for use in controlling the two phases in this manner). When the charge on the plates falls below a certain threshold, for example, the controller may control the drive mechanism to bring the plates into contact, thereby initiating a contact-mode (or charging-mode phase). Once the charge on the plates has once again exceeded a particular threshold, for example, the controller may control the driver to separate the two plates, thus initiating a non-contact (or energy generation) mode. This process may be repeated continually, with contact periodically made and then broken between the plates, in dependence upon the charge state of the plates.

A disadvantage of linear sliding triboelectric generators, such as rotating disk generators, is the fact that the average power that is generated varies over time. The causes of these fluctuations are:

the rotor and stator surfaces wear out when the generator operates in the contact electrification mode. In addition to decreasing the lifetime of the device, the power level of the generator decreases when it operates for an extended period of time in this mode;

the electrical charges that are retained in the rotor can leak. Thus, the power level of the decreases decreases over time when it operates in the non-contact electrostatic induction mode.

Typically, the generator provides power to a load. This load can for example be a battery, a capacitor, a sensor, or an electronic circuit. In most cases, the power level of the signal applied to the load should be constant. Large power level fluctuations can prevent the load from operating correctly. Too large power levels can for example be applied, which could produce a safety issue for the load. On the other hand, the power level could also be smaller than the minimum required level. In this situation, the electronic circuit connected to the generator could for example cease functioning.

A solution is to implement a power conversion circuit which converts the variable power signal into a constant power signal which can be applied to the load. However, such an implementation increases the complexity, size and cost of the system and is thus not desired. Moreover, a power conversion stage consumes a certain power level, which is greater the more complex the power conversion stage needs to be. This can in some cases decrease the efficiency of the system by a non-negligible level.

By operating the generator with periodic but temporarily short contact of the triboelectric materials, as explained above, means the power level decrease occurring during the electrostatic induction mode is compensated by operating the generator in the contact electrification mode for a short period of time. However, this approach does not provide a constant power level over time.

Desired therefore is a power generation or conversion method capable of providing a more constant power output so that the power conversion stage may be simplified. Note that there is a need for this constant output power in triboelectric generators as discussed above, but also in non-contact electrostatic power generators. For example, a generator operated entirely in a non-contact mode will generate power based on electrostatic induction, but as there is no contact charging process, there is no use made of the triboelectric effect. The invention is thus not limited to triboelectric generators.

SUMMARY OF THE INVENTION

The invention is defined by the claims.

According to an aspect of the invention, there is provided an energy conversion system, comprising:

a generator which generates electrical power in response to movement, wherein the generator comprises first and second elements which are moved relatively to each other to generate power; and a drive mechanism for controlling the relative speed, the spacing between, or the relative orientations or positions of the first and second elements during an energy generation mode to decrease the variation in output power or voltage of the generator.

This system controls the physical positions or the motion of the elements of the generator during an energy generation mode in order to implement a more constant power generation. This enables any required power conversion circuitry to be simplified. The relative positions may be changed by implementing a linear relative shift or a rotational (angular) relative shift. An angular shift may be about an axis in parallel with the general plane of the rotor or stator The drive mechanism may comprise a controller which is adapted to maintain a constant output power during the energy generation mode.

In some examples, the first and second elements can be brought into and out of contact with each other, wherein the drive mechanism is further arranged to bring the first and second elements into and out of contact, wherein the energy conversion system has an (e.g. intermittent) charging mode in which the first and second elements are brought into contact by the drive mechanism and an energy generation mode in which the first and second elements are out of contact.

This is appropriate for a triboelectric generator. The use of a contact mode provides increased power generating ability and makes use of the triboelectric effect.

The drive mechanism may comprise a controller which is adapted to control the power or voltage during the energy generation mode. In this way, there is active control of the drive mechanism for example to maintain a constant output power, for example based on feedback information relating to the power output of the generator. Voltage, or current, or current and voltage, measurements of the generator output may be used as feedback parameters.

In one set of examples, the drive mechanism may alter the spacing between the first and second elements during the energy generation mode. The power generated is dependent on the spacing between the elements. A reduction in spacing can give rise to increased power generation. Thus, the spacing may be reduced over time during the energy generation mode in order to compensate for charge leakage.

The drive mechanism may comprise an electroactive polymer actuator. Alternatively, the drive mechanism may comprise a pressure control system, for example an air thrust bearing. These are two possible options for actively controlling the spacing between the elements, although other actuators may instead be used.

For example, other mechatronic actuation elements may include, by way of non-limiting example, stepper motors, motor driven screws, controlled electromagnets, or hydraulic or pneumatic shutters or valves.

The controller may be adapted to reduce the spacing between the first and second elements to zero during the energy generation mode, thereby implementing a transition to the charging mode. In this way, the spacing is gradually reduced during the energy generation mode down to zero, at which point the charging mode is implemented.

In another set of examples, the drive mechanism may alter an angle of tilt between the first and second elements during the energy generation mode. This provides another way to alter the separation, which may be simpler to implement. The first and second elements may face each other at corresponding surfaces, wherein one or both of the surfaces are non-planar. This means that the surfaces may be brought together in progressive way to reduce wear and/or friction.

The first and second elements may comprise first and second disk elements, rotatable with respect to one another, wherein the system further comprises a motor for generating relative motion between the first and second elements. The generator is then a rotating disk generator with a driven rotational speed. The drive mechanism may then comprise a controller which is adapted to drive the motor thereby to control the relative rotational speed between the first and second elements during the energy generation mode.

In this case, the system may be used to convert energy rather than harvest energy. The motor is driven and there is a mechanical coupling implemented by the energy conversion system. The coupled part generates electrical energy. This avoids the need for electrical coupling between components, yet enables electrical energy generation in the isolated component without the need for an internal energy source.

The controller may be adapted to control the relative rotational speed between the first and second elements during the energy generation mode with a constant separation between the first and second elements. This change in speed compensates for charge leakage.

The relative rotational speed may for example be increased. In other examples, the output power may need to be decreased, for example by increasing the separation distance.

The drive mechanism may comprise one or more spiral-patterned layer elements, co-operatively coupled to the first and/or second elements, the spiral patterned layer elements for generating hydrodynamic lift (wherein "hydrodynamic" is used generally to refer to fluid dynamics, i.e. the flow dynamics of gases and liquids) between the first and second elements, in response to rotation, such that the relative rotational speed determines the spacing between the first and second elements. As the elements are rotated relative to one-another, the spiral patterning induces a hydrodynamic lift force between the two, with the magnitude of the force being related to the relative speed of rotation. If the disks are, for example, subject to some small elastic inward bias, then an increase in the speed of rotation will result in a proportional increase in the separation between the plates. A subsequent slowing of the disks results in a consequent narrowing of the spacing between the disk elements.

In this way, the separation between the elements may be controlled indirectly, by controlling the relative speed of rotation. In this case, the controller may be adapted to decrease the relative rotational speed between the first and second elements during the energy generation mode thereby to decrease the separation between the first and second elements. This decrease in spacing compensates for charge leakage.

The examples above make use of active control of the relative position or motion of the elements. A passive approach may instead be adopted, in which the control is dependent on the external stimulus of an energy harvesting system.

For example, the drive mechanism may again comprise one or more spiral-patterned layer elements, co-operatively coupled to the first and/or second elements, the spiral patterned layer elements for generating hydrodynamic lift between the first and second elements, in response to rotation, such that the relative rotational speed determines the spacing between the first and second elements. The relative rotational speed is then dependent on an external input force.

There is then no motor unit needed. Although the separation between the plates is again dependent on the relative speed of rotation, the primary motor driver of the generator comprises an external mechanical source such as wind or water turbine etc. In this way, a more constant output power results automatically in that a slower rotation brings the elements closer together to increase the power generation and a faster rotation brings the elements farther apart.

Additional mechatronic components may additionally be utilized to limit or constrain the effect of the external source where necessary by providing a resistance for example.

In this way the speed might be varied between a maximum (when no mechanical resistance is applied to the external motor source) and a minimum (when maximal resistance force is applied against the motor source).

The system may comprise a sensor for detecting a parameter which is dependent on the state of surface charging of the first and/or second elements, and a controller for controlling the timing and/or duration of the charging mode in dependence on the state of surface charging of the first and/or second elements, for example based on an output voltage of the generator.

The timing of the two phases (contact and non-contact) may be optimized, so as to ensure the maintenance of a particular minimum plate charge, for the realizing of a particular desired output capacity for example, while minimizing the total contact time between the plates. In this way noise and surface wear may be minimized while ensuring that output load does not fall below a desired minimum level.

The controller may comprise a comparator circuit for receiving an output load voltage of the generator. The output power and output voltage of the generator will reduce as the surface charge of the plates leaks away in the (non-contact phase) period following a tribo-charging process. Hence, the state of the surface charge may be assessed by monitoring either the output voltage or the output power as a function of time. In embodiments, therefore, a comparator circuit may be used to compare instantaneous output power with some reference value, for example, and generate an output signal in response.

Examples in accordance with another aspect of the invention provide an energy conversion method comprising:

operating a generator, the generator generating power in response to movement, and comprising first and second elements, the operating of the generator comprising:

controlling the relative speed, the spacing between, or the relative orientations or positions of the first and second elements during an energy generation mode to decrease the variation in output power or voltage of the generator.

The method may comprise:

(e.g intermittently) bringing the first and second elements into and out of contact, so as to (e.g. alternately) realize a charging mode, wherein the elements are in contact, and an energy generation mode in which the first and second elements are out of contact.

This is appropriate for a triboelectric generator.

The method may comprise maintaining a constant output power or voltage during the energy generation mode.

The method may comprise:

altering, for example reducing, the spacing between the first and second elements during the energy generation mode; or generating relative rotation between the first and second elements and controlling the relative rotational speed between the first and second elements with a constant separation during the energy generation mode; or generating relative rotation between the first and second elements and generating hydrodynamic lift in response to the relative rotation, wherein the method comprises controlling the relative rotational speed between the first and second elements during the energy generation mode thereby to control the separation between the first and second elements; or generating a change in a relative angular orientation between of the first and second elements during the energy generation mode; or generating a change in a lateral relative position between the first and second elements during the energy generation mode.

The relative rotational speed mentioned above may be increased or decreased depending on the required control of the output power.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a triboelectric energy conversion system comprising a triboelectric generator which generates electrical power in response to movement, wherein the generator comprises first and second elements which generate energy in an energy generation mode. In some examples, these can be brought into and out of contact with each other by a drive mechanism so that the energy conversion system has an (e.g. intermittent) charging mode in which the first and second elements are brought into contact by the drive mechanism and an energy generation mode in which the first and second elements are out of contact. The relative speed, the spacing between, or the relative orientations of the first and second elements are controlled during the energy generation mode to decrease the variation in output power of the triboelectric generator. This system controls the physical positions or the motion of the elements of the generator during the energy generation mode in order to implement a more constant power or voltage generation. This enables any required power conversion circuitry to be simplified.

Tribo-electric generators can operate in a non-contact mode but provide higher power output if they also exploit intimate contact for tribocharging. However, operating in a contact mode results in issues with noise and device lifetime (surface wear).

This invention can be applied to devices which operate only in non-contact mode, or in devices which include contact charging. If contact charging is desired, periodic but temporarily short contact of the triboelectric materials may be enabled. The use of a non-contact mode overcomes issues with noise, friction and device life-time.

The spacing between generator elements, such as the rotating disks of a rotating disk generator, is particularly important since plate separation distance has a significant impact on the generated triboelectric voltage and power output.

Figure 1:
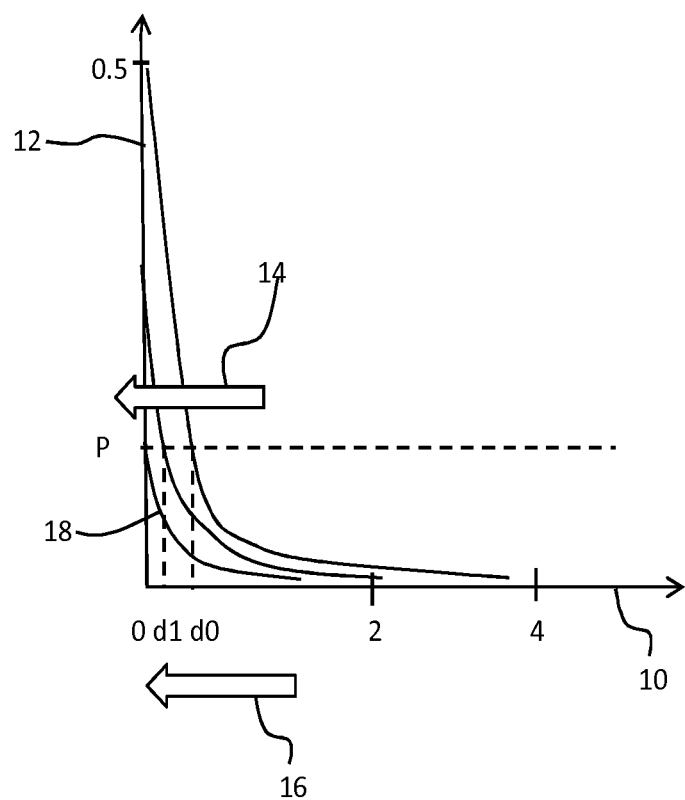
FIG. 1 shows a graph illustrating the relationship between peak power output and plate separation for an example rotating disk triboelectric generator.

In FIG. 1 is shown a graph illustrating a measured relationship between plate separation in mm (x-axis 10) and peak power output in mW (y-axis 12) for an example rotating plate TEG comprising a PTFE rotor. As discussed above, power output is greatest when the plates are in contact (i.e. zero plate separation), reaching a peak output for the example rotor measured for FIG. 1 of approximately 0.5 mW. As plate separation is increased, peak power output falls extremely sharply, with a separation of just 0.5 mm incurring a near 80% output reduction, peak power falling to just 0.1 mW. At a separation of 2 mm, power output has fallen to almost zero.

During the lifetime of the device, the power generation curve shifts to the left as shown by arrow 14. This means that to achieve the same power output P, a reduced gap size is needed, as shown by arrow 16.

Note that depending on the load being driven, the output power may be the most important parameter to be kept constant, or else the output voltage or output current may be the most important parameter to be kept constant.

The invention in one example makes use of gap control to provide a more stable power, voltage output, or current output. However, other parameters may be controlled, such as relative speed or other relative position parameters in order to achieve the same aim.

Figure 2:
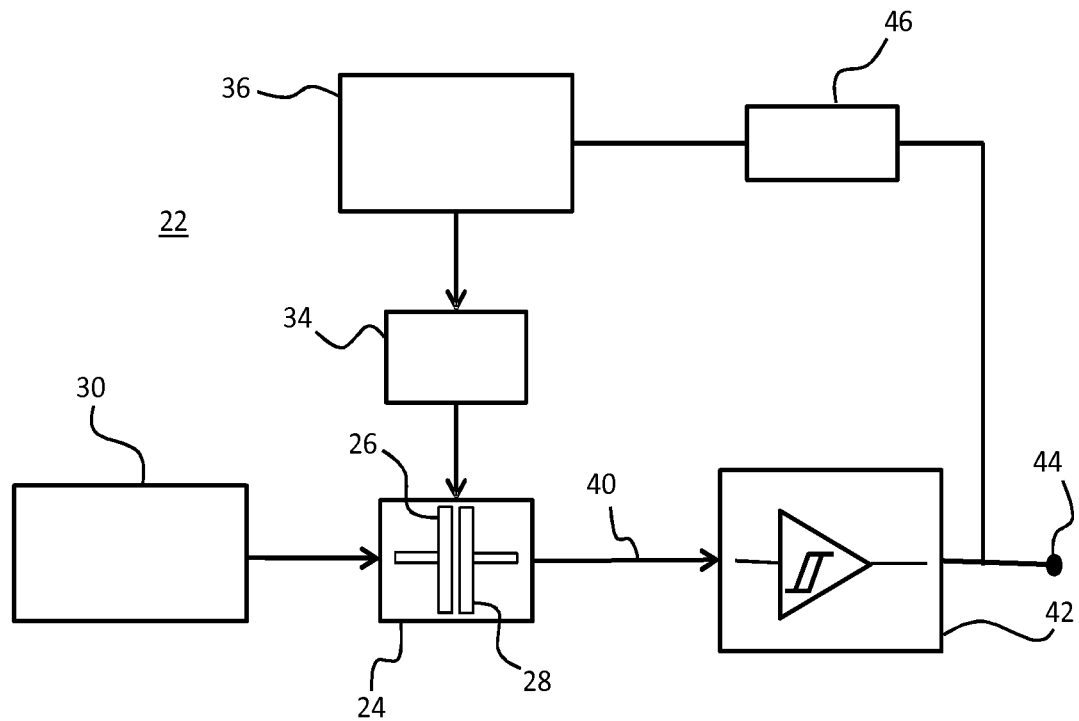
FIG. 2 shows a block diagram of a first example triboelectric energy conversion system.

FIG. 2 shows block diagram of one example arrangement for this system. In this example, a triboelectric generator in the form of a rotating disk TEG 24 is shown for illustrative purposes, but it will be understood by those skilled in the art that the arrangement may equally be applied to other varieties of triboelectric generator (as discussed in previous sections). The generator has generator elements in the form of a rotor 26 and a stator 28. The rotor 26 of the TEG 24 is operatively coupled with a mechanical output of a mechanical drive arrangement 30. The mechanical drive arrangement provides the input source of kinetic or motor energy, which is to be converted by the system into electrical energy.

In some particular examples, a rotating disk TEG may be used wherein the stator 28 comprises a series of disposed (conductive) electrodes, while the rotor 26 comprises a freestanding layer of dielectric (non-metallic) material. In addition (as discussed in Long Lin et al., Noncontact Free-Rotating Disk Triboelectric Nanogenerator as a Sustainable Energy Harvester and Self-Powered Mechanical Sensor. ACS Appl. Mater. Interfaces, 2014, 6 (4), pp. 3031-3038), with such a structure, there is no necessity for electrode deposition or electrical connection for the rotational part, which dramatically improves the operating facility of the generator.

The mechanical drive arrangement 30 may in some embodiments comprise an 'external' source, such as for example a wind or water driven turbine, a vibrational energy source, or human-driven source of motor events. In this case, the system 22 may function as an energy 'harvesting' system, wherein externally generated energy otherwise lost is captured and converted into an electrical energy source. According to alternative embodiments, however, the mechanical drive arrangement may comprise a source 'internal' to the system itself, such as for example a motor unit. In this case, the system 22 may simply provide energy conversion functionality.

Operatively coupled to one or both plates 26, 28 of the TEG 24 is a drive mechanism 34 for controlling the spacing between the first and second elements during an energy generation mode to decrease the variation in output power, voltage, or current of the triboelectric generator. It is controlled by a controller 36.

The invention relates to the control of the configuration of the triboelectric generator during energy generation. However, the control of the separation between the generating elements (e.g. rotor and stator) for periodic contact charging will also be described in detail with reference to FIG. 2.

At the electrical output 40 of the TEG device 24 is a Schmitt-trigger circuit 42, whose output is connected to a $V_{out}$ terminal 44, as well as to the signal input of relay switch 46. The Schmitt-trigger circuit 42 acts as controller for the system 22, controlling, in concert with relay switch 46 and controller 36, the timings and duration of plate contact and non-contact phases.

The movement of the plates between contact and non-contact modes is controlled by the Schmitt-trigger circuit 42 in response to the generator output voltage 40. For example, Schmitt-trigger circuit may be adapted to assess an initial level of the generator output voltage/power, to monitor the reduction in output power/voltage, and switch its output from a high output to a low output in order to indicate that sufficient surface charge has been lost to require initiation of a new tribo-charging phase. In response, relay 46, in connection with Schmitt-trigger circuit output 42, may be correspondingly switched. The controller 36 responds to the switching of relay 46 by triggering the drive mechanism 34 to move the TEG plates 26, 28, into a contact-mode position.

Furthermore, once the tribo-charging process has been triggered, the control electronics may be further adapted to monitor the increase in output voltage/power as the plates charge, and to switch output in order to indicate that sufficient surface charge has been acquired to enable initiation of a new energy generation (non-contact) mode phase. In response, relay 46 may be correspondingly switched. The controller then respond to the switching of relay 46 by triggering the drive mechanism 34 to move the TEG plates 26, 28, into a non-contact mode (generation mode) position.

By way of non-limiting illustration, the Schmitt-trigger circuit may, according to the above described example, be adapted to generate the following outputs:

$$V_{out} \begin{cases} 0, & \text{if } V_{lower\_thresh} > V_{TENG} \\ 1, & \text{if } V_{upper\_thresh} < V_{TENG} \end{cases}$$

The first condition ($V_{out}=0$) initiates the contact mode, and the second condition ($V_{out}=1$) initiates the non-contact mode.

In a first example, the controller controls the drive mechanism 34 to essentially maintain the charge on the plates within a certain defined range of values—between some defined maximum, which when reached during charging, triggers charging to be ended, and some defined minimum which when reached during generation, triggers charging to be initiated. Consequently, power output is similarly maintained within some range of values—between a maximum when charging is maximum and a minimum when charging is minimum. Contact between the plates is restricted only to the minimum required to maintain the threshold charge range.

In accordance with the invention, there is also control to create a more flat output power or voltage profile.

In this first example, power control is implemented using the separation between the rotor 26 and stator 28. Many applications require a fixed level of power (or voltage, or current). In order to simplify the power conversion electronics, the rotating disk TEG generates a fixed power (or voltage, or current) level by controlling the separation gap between the rotor and the stator.

The output signal may be applied directly to a load or it may be applied through further signal processing circuitry.

In a first phase, the rotor 26 is in contact with the stator 28. Electricity is generated by the contact electrification (tribo-charging) between the rotor and the stator.

The separation gap between the rotor and the stator is then fixed to a certain value (e.g. d0 in FIG. 1) such that the TEG generates a defined power or voltage level (P in FIG. 1). Electricity is in this situation generated by electrostatic induction.

During use, the surface charges are slowly lost through charge leakage. In order to maintain the generated power (or voltage) constant, the separation gap between the rotor and the stator is decreased, for example to d1 in FIG. 1.

When the separation gap reaches zero (i.e. there is contact between the rotor and the stator), the cycle returns to the first phase. Electricity is in this situation generated by contact electrification.

After many of these cycles, the rotor and stator surfaces will be worn out as a result of the periodic contact electrification. If the maximum power that can be generated (when in contact mode) is equal or smaller than a certain value, for example the power generation curve has shifted to curve 18, an indication can then be made to the user that the surfaces need to be cleaned, repaired or that the TEG needs to be replaced.

This approach is not limited to power decreases over time which are due to charge leakage. Dynamic control of the plate separation may also be used to maintain a constant output power (or voltage) when any external disturbances are applied to the generator.

Various possibilities exist for the drive mechanism 34. In some examples, a simple stepper motor may be employed to actuate the movement of the plates between different relative positions. For example, the drive mechanism 34 may comprise a stepper motor operatively coupled to just one of the two plates 26, 28. The other plate is maintained in a fixed absolute (axial) position, and the separation between the plates actuated through moving the stepper motor, attached to the first of the plates, between its various steps. Contact and non-contact mode positions are separated by numerous steps of the motor.

In alternative examples, the drive mechanism may comprise a motor-driven screw. Here, a threaded rod (spindle) is threadedly attached to either the rotor, the stator or both. Adjustment of the plate separation may be achieved in this arrangement through utilizing a portion of the drive mechanism to rotate the plate about the spindle, thereby converting rotational movement into linear movement relative to the rod. A fine thread pitch for example would facilitate very precise adjustment of the plate positioning. Position determination feedback could be achieved by an optical shaft encoder on the spindle for example.

In another example, a controlled electromagnet may be employed to pull the rotor 26 and stator 28 together. Monitoring the current in the electromagnet may in this case form part of a feedback and control mechanism. For rotors made of non-magnetic materials such as aluminum, a permanent magnet could be used, with the pulling force between the disks generated by eddy currents. Separation distance could then be regulated by the rotational speed of the generator. However, where rotational speed needs to be kept constant in the TEG, or for embodiments in which rotational speed is not controlled by the system (for example where the mechanical drive arrangement 30 is an external source), a controllable electromagnet may be used.

According to one or more example embodiments, the separation between the plates may be effected by an actuator utilizing layers of EAP (electroactive polymer) material, and/or SMM (shape memory material) or any other responsive material capable of mechanical actuation.

Figure 3:
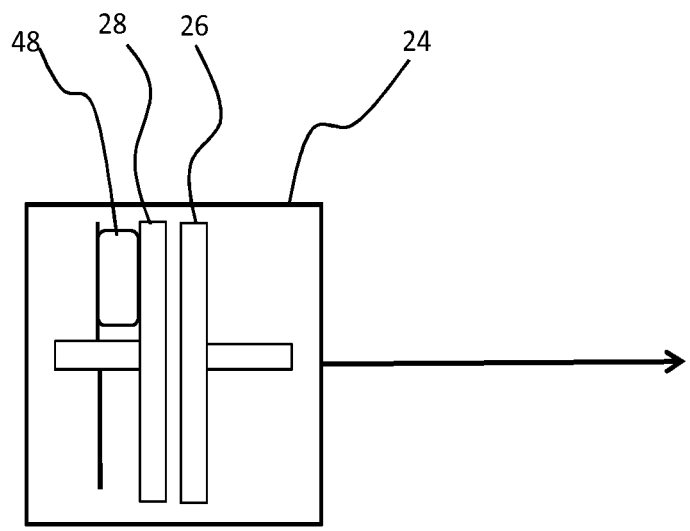
FIG. 3 shows one example of how to control the plate separation in the generator

FIG. 3 shows an example in which the separation distance between the rotor 26 and the stator 28 is controlled by an actuator, such as an Electro Active Polymer (EAP) actuator 48. The EAP actuator 48 controls the position of the stator relative to the rotor. When the output power (or voltage, or current) of the TEG decreases, the EAP actuator is controlled to expand and thereby push against the stator (as the opposite side is against a fixed mechanical support), such that the stator is moved closer to the rotor in order to maintain the output power constant. On the other hand, when the output power (or voltage) of the TEG increases, the EAP actuator is controlled to contract such that the stator is moved away from the rotor in order to maintain the output power constant.

In some embodiments, the plate separation mechanism may comprise a pneumatic spring-loaded 'valve', wherein the plates are elastically compressed together (by, for example, a spring), and pressurized air is delivered between the rotor and stator, thereby providing a separation between the plates having a distance proportional or otherwise dependent on the pressure of the delivered air. The reaction force provided by the spring can be used as an automatic reverse mechanism to induce contact mode once the supply of air is stopped or reduced. In accordance with this or other embodiments, shutters or valves, for example hydraulically or pneumatically controlled, may be used to control the flow rate (and hence supplied pressure) of the delivered air.

Figure 4:
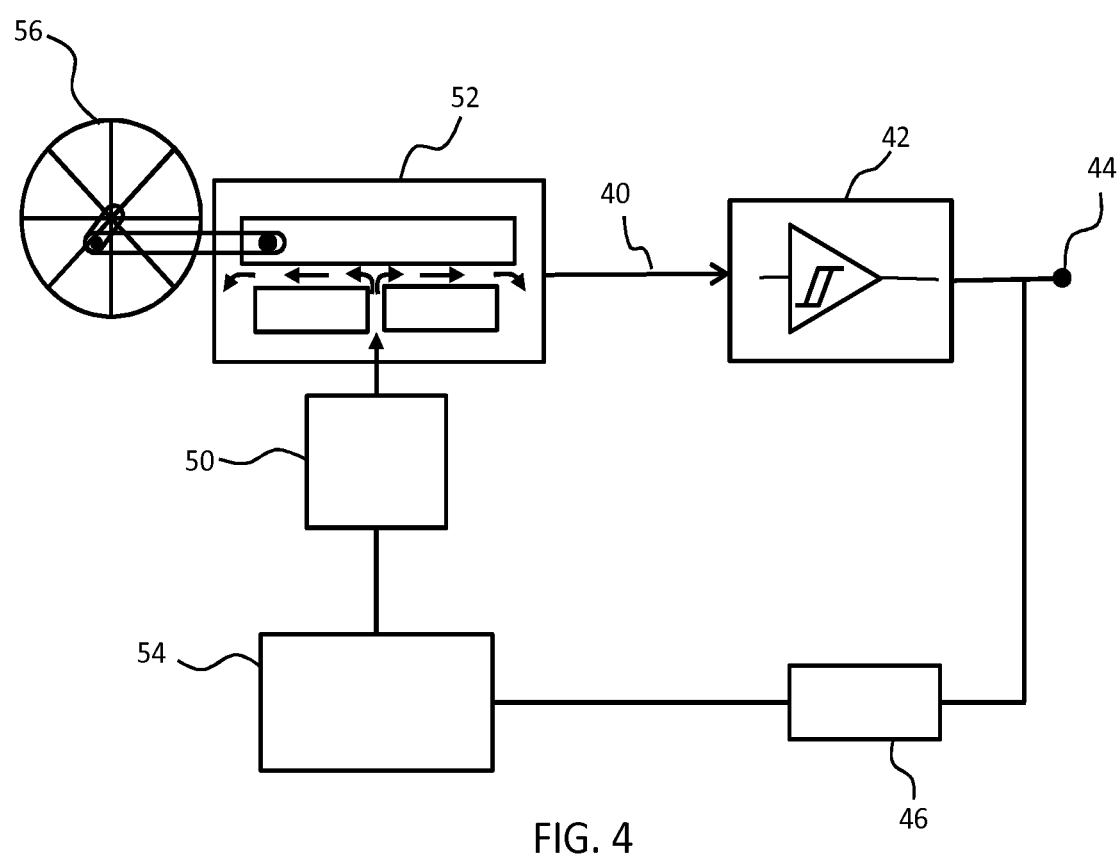
FIG. 4 shows a block diagram of a second example triboelectric energy conversion system.

FIG. 4 illustrates one example arrangement comprising a pressurized air pneumatic drive mechanism 50 in concert with a reciprocating sliding TEG 52. The pneumatic drive mechanism injects pressurized air between the plates of the TEG thereby providing a thrust bearing supporting the plates' relative separation against some resisting compressive force (provided for example by a spring or alternatively by gravity). According to this example, lateral sliding motion between the plates is generated by an external mechanical drive arrangement 56, comprising a wind or water turbine, co-operatively coupled with an upper (sliding) plate of the TEG 52. As in the example of FIG. 2, a Schmitt-trigger circuit 42 controls the timings and duration of contact and non-contact mode phases in response to the value of the TEG output voltage 40, for example switching to a low output when a charging (contact) mode is to be initiated, and to a high output when a generating (non-contact) mode is to be initiated. These high and low outputs trigger relay 46 to generate corresponding outputs, in response to which a controller 54 is adapted to control the pneumatic drive mechanism 50 to vary the pressure/flow rate of injected air between the plates of the TEG between high pressure (non-contact mode) and low pressure (contact mode).

In some examples of this arrangement, pneumatic drive arrangement 50 controls the flow rate of air, and hence switches between non-contact and contact modes, by way of a pneumatic valve.

The use of air to provide a bearing for supporting the separation between the plates may be particularly desirable, since this avoids the need for parts making solid mechanical contact with plates to manipulate them. This in turn may avoid or reduce unnecessary wear or material strain, increasing lifetime and/or efficiency of the TEG device and/or driver components. In addition, such air thrust bearings may reduce the number of mechanical components within the overall device, eliminating potential sources of faults. Also air thrust bearings may be more energy efficient, since there is little frictional resistance due to mechanical connections between joints/parts.

The two examples above are based on controlling the plate separation. The output power or voltage may equally by controlled by regulating the relative speed of rotation of the rotor and stator.

Figure 5:
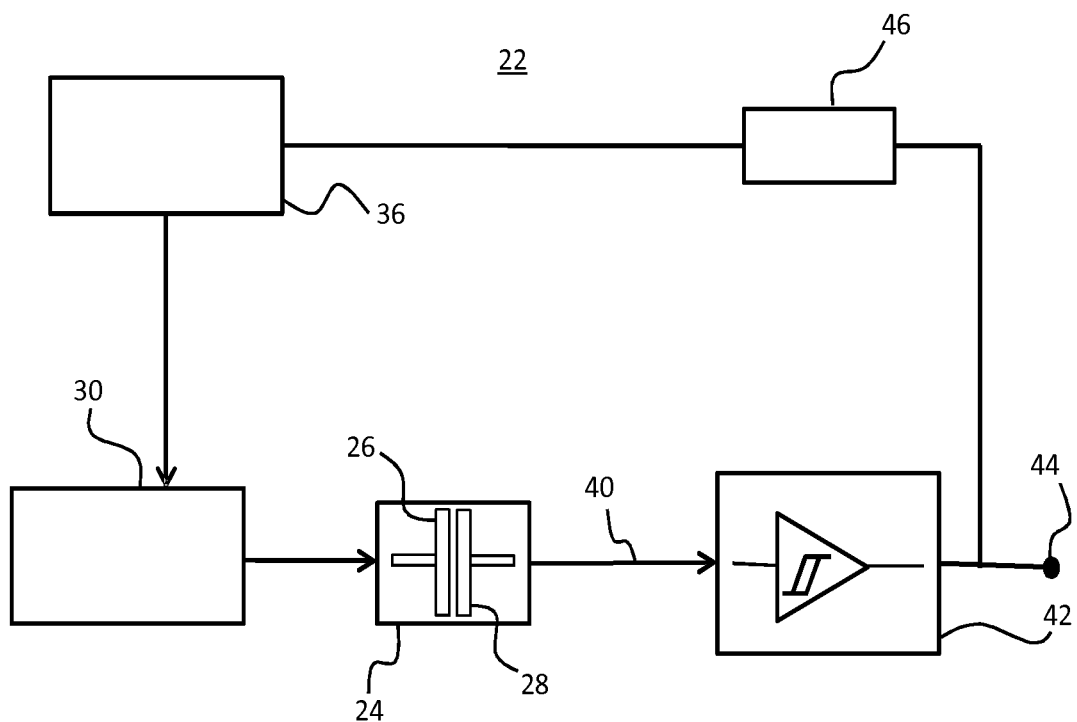
FIG. 5 shows a block diagram of a third example triboelectric energy conversion system.

FIG. 5 shows an example. The mechanical drive arrangement 30 comprises a motor and the motor speed is controlled by the controller 36.

The TEG is then being used to transfer power from a driven rotor to the stator, and it is possible to control the rotation speed of the rotor. Unlike the previous embodiment where the separation distance is controlled in order to achieve constant output power or voltage, the rate of rotation of the motor is in this embodiment adjusted to ensure that the power or voltage output remains constant. For example, as the charge state of the rotor reduces, the rotation rate can be increased to maintain a constant power output (as power scales linearly with rotation rate). Alternatively, if any change in separation distance occurs for example as a result of wear, the change in output explained with reference to FIG. 1 can be (at least partially) compensated by either increasing or decreasing the rate of rotation.

The sequence of operation is otherwise as described above. The rotational speed is increased to a certain point, and when that point it reached, it can be used as an indication that the contact charging step is to be performed. Thus, the speed control can also trigger the contact charging mode in the same way that the reduction of separation distance to zero is used to trigger the contact charging mode in the first example above.

In both examples, the output power, output voltage, or output current is measured (from the electrical output 40). If the measured voltage or power is below a target voltage, current, or power, the separation distance is reduced, or the speed is increased. If the measured voltage, current, or power is above a target voltage, current or power, the separation distance is increased, or the speed is reduced. A hysteresis may be used to ensure stable operation of the feedback control. The smaller the hysteresis, the smaller the variation in output power (or voltage, or current).

Another way to control the separation distance indirectly is to use a self-regulating thrust bearing which uses the motion of the plates themselves to generate a source of hydrodynamic lift. According to this example, spiral patterning is provided to the inward-facing surfaces of plates of a rotating disk TEG such that when the plates are rotated, the patterning acts to generate a film of pressurized air in the space between the plates, generating a force which pushes the plates apart.

Figure 6:
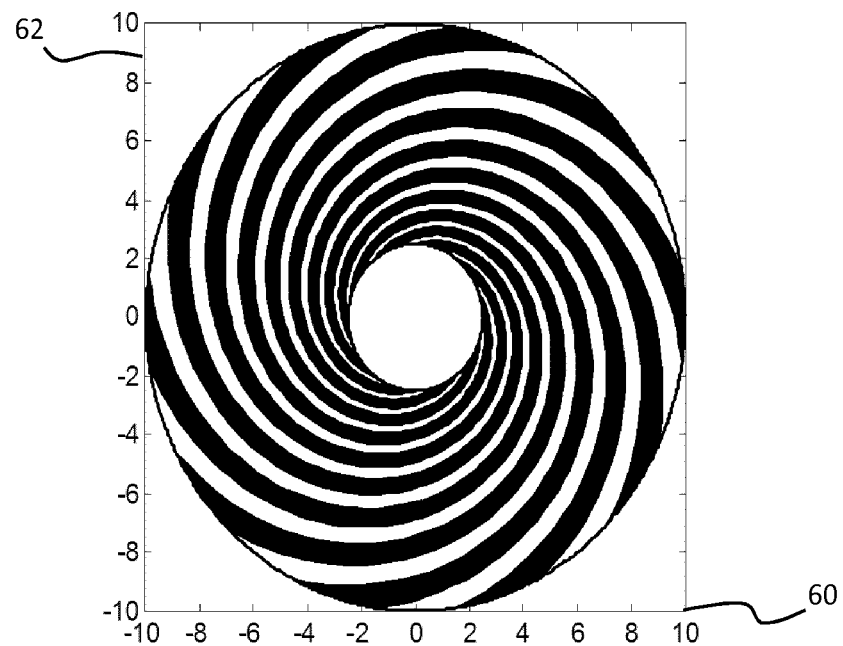
FIG. 6 shows an example spiral patterning for an example self-regulating rotating disk TEG having hydrodynamic air thrust bearing.

FIG. 6 illustrates one example of a spiral patterning which may be provided to plates of a TEG, wherein the x (60) and y (62) axes represent width and height measurements, in mm, respectively. The spiral pattern may be imprinted (or engraved, lasered or formed by any other suitable means as will be understood by the skilled person) on the stator, the rotor, or on both.

The magnitude of the generated hydrodynamic force is related to the speed of rotation, so that faster rotating plates induce a greater magnitude of force. The plates may be subjected to some (small) inward bias force pushing the plates together, for example, such that increases and decreases in plate speed—and hence lift force—result in stable increases and decreases in plate separation. In this case, the motion of the TEG plates itself directly drives the inward and outward adjustment of plate separation. Plate separation can be very precisely controlled in this way.

This approach may be implemented by the system shown in FIG. 5, in which the mechanical drive arrangement is in the form of a motor 30 which is controlled to implement the plate separation indirectly by controlling the relative speed.

In this example, when the controller 36 detects that the output power (or voltage, or current) of the TEG is smaller than a certain threshold value, it sends a control signal to the motor in order to decrease its rotational speed. Since the TEG incorporates a spiral groove structure, it will result in a decrease of the separation distance between the rotor and the stator, which will increase the output power (or voltage) of the TEG. The effect of the reduction in plate separation dominates over the reduction in speed. In particular, the output power is linearly proportional to the rotational speed, whereas the output power can increase significantly by slightly reducing the separation distance.

If the controller 36 detects that the output power (or voltage, or current) increases above a certain value, it sends a control to the motor in order to increase its rotational speed. This action will result in an increase of the separation distance between the rotor and the stator, which will decrease the output power (or voltage) of the TEG.

In another example which makes use of the hydraulic bearing, the source of mechanical motion may instead be provided by an 'external' mechanical source, such as for example wind or water—as in the example of FIG. 4.

In this case, the speed of the plates cannot be controlled 'at source'.

Figure 7:
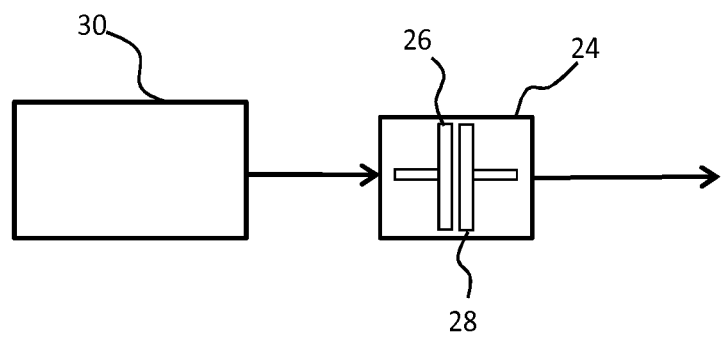
FIG. 7 shows a block diagram of a fourth example triboelectric energy conversion system.

In a most simple implementation shown in FIG. 7, the mechanical drive arrangement 30 is not controlled at all and the operation the hydraulic bearing is passive. The rotation speed of the rotor is thus more difficult to control. In this embodiment, the rate of rotation of the rotor not only results in a (linear) change in power output, but is further able to control the separation of the gap—the gap increasing as the rotation speed increases. This combination of effects helps to maintain a more constant power output in the case that the rotation speed is varying, as the increase of power resulting from an increase of speed is compensated by an increase of gap generated by the spiral groove bearing.

This most basic arrangement does not allow for control of the periodic contact charging, and may be used for a lower power contactless approach. However, the plate separation may furthermore be controlled through use for example of one or more additional actuation elements which provide some mechanical resistance against the external input to thereby limit the speed of rotation. The maximum speed would in this case still be determined by the external source, but by selectively applying resistance to the mechanical output of this source, the rate of energy transfer to the TEG can be controlled. In this way, the output power may be controlled more accurately, but also the periodic contact charging mode may also be implemented.

In the examples above, the parallel separation distance and/or the relative rotational speed are controlled.

There are various alternative ways to implement a change in relative orientation, in order to influence the coupling between the generating elements.

Figure 8:
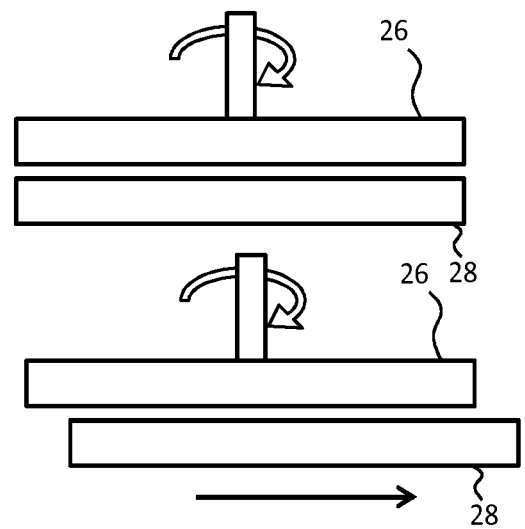
FIG. 8 shows a first alternative way to control the rotor and stator configuration.

FIG. 8 shows an example in which an axial misalignment between the rotor 26 and stator 28 is accurately controlled. The top image shows perfect alignment with the rotor and stator sharing a common central axis, and the bottom image shows a lateral misalignment which means the central axes are offset from each other.

The output power of the rotating TEG is in this way controlled by adjusting the axial alignment between the stator and rotor. In one example, the rotor 26 is fixed on a rotational axis and driven by the external force. The stator is movable, for example mounted on a sliding platform, such that the horizontal distance between the stator/rotor centers can be accurately adjusted. Such a deliberate alignment mismatch will reduce the output power and allows for precise output power management and feedback.

Of course other configurations are possible, with either one or both of the rotor and stator with an adjustable position.

When the maximum output power is required the stator/rotor planes will return to be aligned concentrically. If less power needs to be generated, the stator is slid away from the rotor thus increasing the distance between the stator and rotor centers, reducing the output power.

Figure 9:
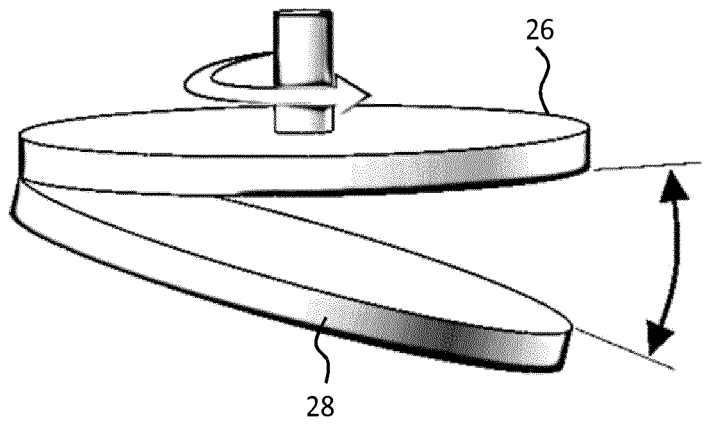
FIG. 9 shows a second alternative way to control the rotor and stator configuration.

A further example makes use of a tilt angle between the stator 28 and rotor 26 as shown in FIG. 9. The rotor 26 is fixed on a rotational axis and driven by an external force. The stator 28 is mounted on a tilting platform, such that the angle between the stator/rotor plane can be accurately adjusted. Such a tilt angle allows for precise output power management and feedback. When maximum output power is required the stator/rotor planes will be aligned to be parallel. If less power needs to be generated, the stator may be tilted away from the rotor thus increasing angle between the stator/rotor planes, reducing the output power.

Again other configurations are possible, with either one or both of the rotor and stator with an adjustable tilt.

The output power of the rotating TEG (consisting of rotor and stator) is thus controlled via the tilt angle between the stator and rotor. The tilting movement may be applied in any appropriate direction (e.g. around the x-axis and/or around the y-axis, where the x-axis and y-axis together define the plane of the fixed rotor).

An advantage of this embodiment is that by tilting it is possible to fix a relative position more accurately than when a controlled spacing is realized between the plates. Furthermore, the tilting results in a contact only at the edges of rotor and stator. This can be particularly advantageous if the electrode structures are chosen not to extend to the edges of the rotor/stator as in this case there will be no wear of the active area of the device during operation (other than when a contact mode is used). Only the edges will wear—but they are then functionally non-active.

Figure 10:
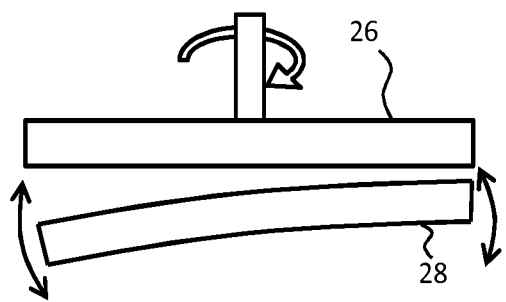
FIG. 10 shows a third alternative way to control the rotor and stator configuration.

FIG. 10 shows an example in which power control is achieved by using a convex rotor or stator in combination with the tilt angle control described with reference to FIG. 9.

FIG. 10 shows the stator 28 curved into a convex shape (convex when viewed from below and concave when viewed from above). The rotor may instead be curved and the stator flat, or else both may be curved. The output power of the rotating TEG is again controlled via the tilt angle between the stator and rotor. The rotor is fixed on a rotational axis and driven by the external force. As in the example of FIG. 9, the stator is mounted on a tilting platform to provide precise output power management and feedback.

The point of contact or near contact between the stator and rotor can be shifted by changing the axis about which tilting takes place. Moving the contact point periodically along the stator surface will result in less wear and/or reduced friction during the charging mode compared to a flat stator.

The curved arrangement also enables a smooth transition from a non-charged state towards a fully charged state, since the contact-point along can be moved across the stator to fully charge the complete stator surface, whereas a flat stator and rotor arrangement will immediately start charging rapidly upon contact.

Figure 11:
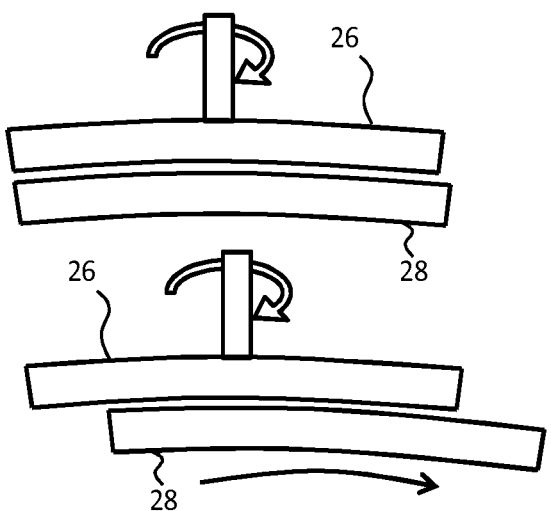
FIG. 11 shows a fourth alternative way to control the rotor and stator configuration.

FIG. 11 shows an example which combines the axial misalignment as explained with reference to FIG. 8 with a convex/concave rotor and stator design. The output power is controlled by adjusting the axial alignment between the stator and rotor. As in the examples above, when maximum output power is required, the stator and rotor planes will be aligned concentrically. If less power needs to be generated, the stator is slid away from the rotor center thus increasing the distance between the stator and rotor centers, reducing the output power. The sliding may be linear, but the misalignment may instead be induced by an off-axis rotation of the stator.

It can thus be seen that a misalignment may be controlled to be a lateral misalignment or an axial misalignment.

Another example makes use of a ball joint rotor and stator design for power control. The ball joint has a rotor and stator implemented as a ball and socket, with one rotatable relatively to the other, and with a controllable angle between the two.

Figure 12:
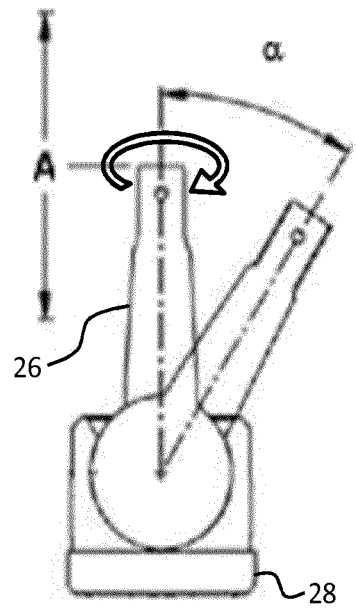
FIG. 12 shows a fifth alternative way to control the rotor and stator configuration.
Figure 12:
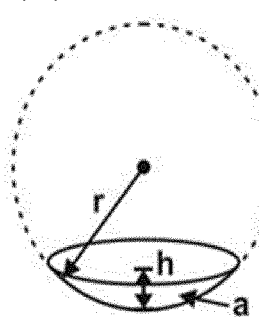
Figure 12:
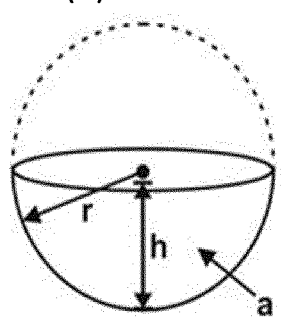
Figure 12:
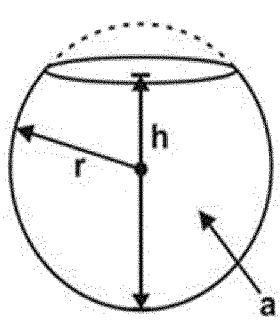

FIG. 12(a) shows a ball and socket joint, with the rotor 26 implemented with a ball joint part, received in the socket part of the stator 28. It shows two possible angular positions for the rotor 26 separated by an angle α.

By careful design of the power generating parts (geometry, area and/or material choice) associated with the rotor and stator it is possible to change the output based on the tilt angle α. A separation distance may also be controlled based on adjusting the position of the point shown as 'A'.

The radii of the rotor and stator do not need to be limited to one value. A shape with multiple radii such as a curved oval shape can be used to obtain different output signals.

The stator may also be rotatable to adjust the interface between the rotor and stator. FIGS. 12(b), (c) and (d) show different possible ball designs, all based on portions of a sphere, with radius 'r', area 'a' and height 'h'. However, the approach is not limited to balls or hemispheres. They may also use oval based 3D shapes.

Figure 13:
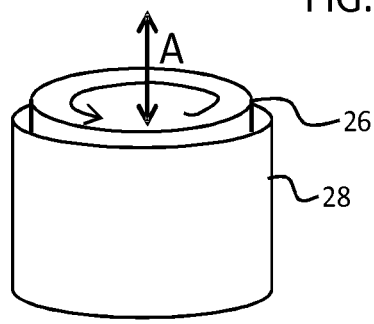
FIG. 13 shows a sixth alternative way to control the rotor and stator configuration.

A final example is to use a double-walled cylinder as shown in FIG. 13, with one functioning as the rotor 26 and the other functioning as the stator 28. A linear relative adjustment (parallel to the cylinder axis) influences the overlap between the cylinders, denoted by 'A' in FIG. 13. This approach is not limited to cylinder geometries, but may be based on cone, tapered and bullet (cylinder plus hemisphere) geometries. By adjusting the relative position A, the contact area or overlap area can be changed to obtain a different output signal.

It can be seen from the examples above that the output power can be adjusted by varying:

a degree of overlap between two or three dimensional rotor and stator surface shapes, based on relative position adjustment;

an amount of spacing between two or three dimensional rotor and stator surface shapes, based on adjustment of a uniform spacing (i.e. linear position adjustment) or adjustment of a relative orientation e.g. tilt angle which changes the shape of a non-uniform spacing (i.e. orientation adjustment);

a relative speed of rotation of the rotor and stator.

The position adjustment may be in the plane of the rotor or stator, or in the general plane of the rotor or stator (for a non-flat stator or rotor) to provide axial alignment control or it may be perpendicular to the plane to provide spacing adjustment.

In the examples above which make use of a cyclic contact charging mode, the change in an output voltage of the generator is used to determine timings and/or duration of contact (charging) and non-contact (generating) mode phases. It may also be desirable for a controller to determine when and whether contact between the plates has been established. This information may be utilized to provide real-time feedback to the drive mechanism mechanically controlling the separation of the plates. A sensor element may also be used to determine when and whether contact has been made between plates of a TEG 24.

In the examples above where the separation gap is controlled, the separation distance may be continuously adjusted, smoothly transitioning between a first (maximal) separation distance, to a final plate-contact state. In other examples, the controller may be adapted to transition the plates between one of a discrete set of separation values, these defining either uniform or non-uniform intervals across the total range of values.

In some embodiments, the controlling of timing and/or duration of contact and non-contact phases may be performed in response to or in dependence on user input commands. In this case a controller may be adapted to output information concerning parameters of the system, such as the charge state of the plates, for use in manually controlling the timings and/or duration of the different modes. This output information might be communicated to the user visually or acoustically via a provided display unit, for instance, or through a loud-speaker element. It might alternatively be communicated haptically, via a vibrating control handle or joystick, as one example. Direct user-machine interaction might be enabled via one or more user-feedback elements, such as for example an integrated joystick, wherein 'live' information may be relayed to the user regarding, for example, a charge state or other parameters of the generator, enabling a user to respond directly in providing input control commands for controlling the system.

According to one or more embodiments, the system may provide entirely 'manual' tribo-charging and generation functionality: the timings and/or duration of charging and non-charging mode phases may be controlled by a user via various user input/output elements. Control of the timings and/or duration of contact and non-contact mode phases might be provided manually, selectable in response to user input commands, while the mechatronic or otherwise control/driving of plate separation might be automated. Hence a controller might be adapted to automatically control the initiation or transition from or to either a charging or non-charging mode, in response to certain dedicated user input commands.

The applications for above-described triboelectric energy conversion system embodiments are extremely numerous. In particular, the ability to generate small sources of current for the powering of small components within a device, without the need to provide a dedicated power source, or a supply line to the primary power source of the device, is extremely valuable. Any device which, in the course of its normal operations, either generates or otherwise has access to sources of motor energy, may provide current or/and voltage to one or component parts through locally positioned TEG generators.

By way of non-limiting illustration, certain personal handheld care devices, such as for example shavers or (manual or electronic) toothbrushes, might make use of the triboelectric systems of the present invention in order to power one or more components within those devices. For example, it may be advantageous within certain applications of an electric toothbrush for instance, that the toothbrush comprise one or more sensors mounted within or about the head of the brush. In this case it is undesirable that the brush head be supplied with a voltage from the primary battery source of the toothbrush, since this may incur a consequent risk of user electrification, should the head casing develop a fault and wires are exposed, or are otherwise brought into conductive contact with portions of a user's mouth. In this case, a TEG conversion system in accordance with the present invention may be advantageously incorporated within the head, harvesting kinetic energy from the motion of the toothbrush head (induced by the primary motor of the toothbrush device), to thereby generate the small level of voltage required to drive the one or more sensors within the head.

The example embodiments of driving systems and methods disclosed above are described in particular in relation to a rotating disk and reciprocating sliding plate tribo-electric generators. However, these particular examples are to be understood as purely illustrative and exemplary, and it will be understood by one skilled in the art that the methods and systems described are applicable to all types of triboelectric generator.

The invention can be summarized in general by the following embodiments:

EMBODIMENTS

1. An energy conversion system, comprising:
a generator (24) which generates electrical power in response to movement, wherein the generator comprises first (26) and second (28) elements which are moved relatively to each other to generate power; and
a drive mechanism for controlling the relative speed, the spacing between, or the relative orientations or positions of the first and second elements during an energy generation mode to decrease the variation in output power, or voltage, or current of the generator.

2. A system according to embodiment 1, wherein the drive mechanism comprises a controller which is adapted to maintain a constant output power, or voltage, or current during the energy generation mode.

3. A system according to embodiment 1 or 2, wherein the first (26) and second (28) elements which can be brought into and out of contact with each other, wherein the drive mechanism is further for bringing the first (26) and second (28) elements into and out of contact, wherein the energy conversion system has an intermittent charging mode in which the first and second elements are brought into contact by the drive mechanism and an energy generation mode in which the first and second elements are out of contact.

4. A system according to any preceding embodiment, wherein the drive mechanism comprises a controller which is adapted to alter, for example reduce, the spacing between the first and second elements during the energy generation mode.

5. A system according to embodiment 4, wherein the drive mechanism comprises:
an electroactive polymer actuator; or
a pressure control system and wherein the spacing between the first and second elements is controlled by an air thrust bearing.

6. A system according to embodiment 4 or 5, wherein the controller is adapted to reduce the spacing between the first and second elements to zero during the energy generation mode, thereby implementing a transition to a charging mode.

7. A system according to any one of embodiments 1 to 3, wherein the drive mechanism comprises a controller which is adapted to alter an angle of tilt between the first and second elements during the energy generation mode.

8. A system according to embodiment 7, wherein the first and second elements face each other at corresponding surfaces, wherein one or both of the surfaces are non-planar.

9. A system according to any preceding embodiment, wherein the first (26) and second (28) elements comprise first and second disk elements, rotatable with respect to one another, wherein the system further comprises a motor for generating relative motion between the first (26) and second (28) elements, and wherein the drive mechanism comprises a controller which is adapted to drive the motor thereby to control the relative rotational speed between the first and second elements during the energy generation mode.

10. A system according to embodiment 9, wherein the controller is adapted to control the relative rotational speed between the first and second elements during the energy generation mode with a constant separation between the first and second elements.

11. A system according to embodiment 9, wherein the drive mechanism comprises one or more spiral-patterned layer elements, co-operatively coupled to the first (26) and/or second (28) elements, the spiral patterned layer elements for generating lift between the first and second elements, in response to rotation, such that the relative rotational speed determines the spacing between the first and second elements.

12. A system according to embodiment, wherein the controller is adapted to control the relative rotational speed between the first and second elements during the energy generation mode thereby to control the separation between the first and second elements.

13. A system according to embodiment 1, wherein the drive mechanism comprises one or more spiral-patterned layer elements, co-operatively coupled to the first (26) and/or second (28) elements, the patterned layer elements for generating lift between the first and second elements, in response to rotation, such that the relative rotational speed determines the spacing between the first and second elements, and wherein the relative rotational speed is dependent on an external input force.

14. A system according to any preceding embodiment, further comprising a sensor for detecting a parameter which is dependent on the state of surface charging of the first and/or second elements, and a controller for controlling the timing and/or duration of the charging mode in dependence on the state of surface charging of the first and/or second elements, for example based on an output voltage of the generator.

15. An energy conversion method comprising:
operating a generator (24, 52), the generator generating power in response to movement, and comprising (26) first and second (28) elements which are moved relatively to each other to generate power, the operating of the generator comprising:
controlling the relative speed, the spacing between, or the relative orientations or positions of the first and second elements during an energy generation mode to decrease the variation in output power or voltage of the generator,
wherein the method optionally further comprises intermittently bringing the first (26) and second (28) elements into and out of contact, so as to alternately realize a charging mode, wherein the elements are in contact, and an energy generation mode in which the first and second elements are out of contact.

Further more specific embodiments are disclosed and claimed in the appended claims.

The invention can shortly be summarized as an energy conversion system which comprises a generator which generates electrical power in response to movement, wherein the generator comprises first and second elements which generate energy in an energy generation mode. In some examples, these can be brought into and out of contact with each other by a drive mechanism so that the energy conversion system has an intermittent charging mode in which the first and second elements are brought into contact by the drive mechanism and an energy generation mode in which the first and second elements are out of contact. The relative speed, the spacing between, or the relative orientations or positions of the first and second elements are controlled during the energy generation mode to decrease the variation in output power or voltage of the generator. This system controls the physical positions or the motion of the elements of the generator during the energy generation mode in order to implement a more constant power or voltage generation. This enables any required power conversion circuitry to be simplified.

Other variations to the disclosed embodiments and claims can be understood and effected by those skilled in the art in practicing the the disclosed embodiments and claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:
1. An energy conversion system, comprising:
a generator that generates electrical power in response to movement,
wherein the generator comprises first and second elements that are moved relatively to each other to generate power; and
a drive mechanism that controls a relative speed, a spacing between, or a relative orientation or position of the first and second elements during an energy generation mode based on a measure of at least one of: output power, voltage, and output current of the generator,
wherein the drive mechanism comprises a controller that reduces a variation in the at least one of output power, output voltage, or output current during the energy generation mode, and
wherein the drive mechanism adjusts a spacing between the first and second elements,
wherein the energy conversion system has a charging mode in which the first and second elements are brought closer together by the drive mechanism, and an energy generation mode in which the first and second elements are farther apart.

2. The system of claim 1, wherein the controller also reduces the spacing between the first and second elements during the energy generation mode.

3. The system of claim 2, wherein the drive mechanism comprises at least one of:
an electroactive polymer actuator; and
a pressure control system,
wherein the spacing between the first and second elements is controlled by an air thrust bearing.

4. The system of claim 2, wherein the controller reduces the spacing between the first and second elements to zero during the energy generation mode, thereby implementing a transition to a charging mode.

5. The system of claim 1, wherein the controller adjusts the spacing by altering an angle of tilt between the first and second elements during the energy generation mode.

6. The system of claim 5, wherein the first and second elements face each other at corresponding surfaces, wherein one or both of the surfaces are non-planar.

7. The system of claim 1,
wherein the drive mechanism comprises one or more spiral-patterned layer elements that are co-operatively coupled to the first and/or second elements,
wherein the patterned layer elements generate lift between the first and second elements, in response to rotation, such that the relative rotational speed determines the spacing between the first and second elements, and wherein the relative rotational speed is dependent on an external input force.

8. The system of claim 1, further comprising a sensor that detects a parameter that is dependent on a state of surface charging of the first and/or second elements,
wherein the controller for controls the timing and/or duration of the charging mode in dependence on the state of surface charging of the first and/or second elements.

9. The system of claim 1,
wherein the drive mechanism comprises a pneumatic drive, and
wherein the controller controls the spacing between the first and second elements by controlling a pressure provided by the pneumatic drive.

10. The system of claim 1, wherein the drive mechanism comprises a passive element that urges at least one of the first and second elements in a first direction, and a controllable element that urges the at least one of the first and second elements in a second direction that is opposite the first direction.

11. An energy conversion system, comprising:
a generator that generates electrical power in response to movement,
wherein the generator comprises first and second elements that are moved relatively to each other to generate power; and
a drive mechanism that controls a relative speed, a spacing between, or a relative orientation, or position of the first and second elements during an energy generation mode based on a measure of at least one of: output power, output voltage, or output current of the generator,
wherein the drive mechanism comprises a controller that reduces variation in the at least one of output power, output voltage, or output current during the energy generation mode, and
wherein the first and second elements comprise first and second disk elements, rotatable with respect to one another,
wherein the system further comprises a motor that generates relative motion between the first and second elements, and
wherein the controller drives the motor to control the relative rotational speed between the first and second elements during the energy generation mode.

12. The system of claim 11, wherein the controller controls the relative rotational speed between the first and second elements during the energy generation mode with a constant separation between the first and second elements.

13. The system of claim 11,
wherein the drive mechanism comprises one or more spiral-patterned layer elements that are co-operatively coupled to the first and/or second elements,
wherein the spiral patterned layer elements generate lift between the first and second elements, in response to rotation, such that the relative rotational speed determines the spacing between the first and second elements.

14. The system of claim 13, wherein the controller controls the relative rotational speed between the first and second elements during the energy generation mode to control the separation between the first and second elements.

15. The system of claim 11, wherein the first and second elements are curved.

16. An energy conversion system, comprising:
a generator that generates electrical power in response to movement,
wherein the generator comprises first and second elements that are moved relatively to each other to generate power; and
a drive mechanism that controls a relative speed, a spacing between, or a relative orientation or position of the first and second elements during an energy generation mode based on a measure of at least one of: output power, output voltage, and output current of the generator,
wherein the drive mechanism comprises a controller that reduces variation in the at least one of output power, output voltage, or output current during the energy generation mode, and
wherein the drive mechanism adjusts an amount of overlap between the first and second elements,
wherein the energy conversion system has a charging mode in which the first and second elements are driven by the drive mechanism to achieve a larger overlap, and an energy generation mode in which the first and second elements are driven by the drive mechanism to achieve a lesser overlap.

17. The system of claim 16, wherein the drive mechanism adjusts the amount of overlay by laterally moving at least one of the first and second elements.

18. The system of claim 16,
wherein the first element includes a disk that is rotated, and
wherein the second element is laterally moved relative to the first element.

19. The system of claim 18, wherein the first and second elements are curved.

20. The system of claim 16, wherein the first and second elements are curved.

* * * * *